Figure 2:
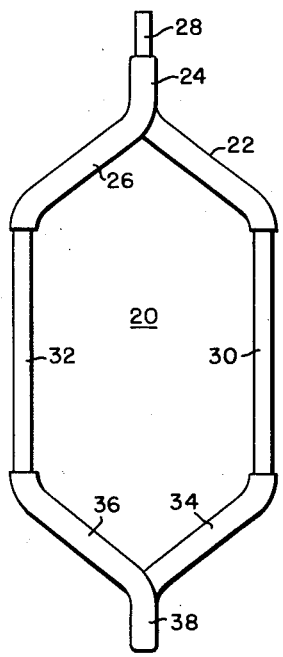

Sept. 18, 1962     D. A. ROGERS, JR     3,054,770
POLYMERIZABLE RESINOUS COMPOSITION COMPRISING AN UNSATURATED
POLYESTER AND A MIXTURE OF ETHYLENICALLY UNSATURATED
MONOMERS COPOLYMERIZABLE THEREWITH, ELECTRICAL
MEMBER IMPREGNATED THEREWITH, AND
METHOD OF PREPARING SAME
Filed Feb. 12, 1958

WITNESSES

INVENTOR
Dow A. Rogers, Jr.
BY
ATTORNEY

United States Patent Office 3,054,770
Patented Sept. 18, 1962

3,054,770
POLYMERIZABLE RESINOUS COMPOSITION COMPRISING AN UNSATURATED POLYESTER AND A MIXTURE OF ETHYLENICALLY UNSATURATED MONOMERS COPOLYMERIZABLE THEREWITH, ELECTRICAL MEMBER IMPREGNATED THEREWITH, AND METHOD OF PREPARING SAME
Dow A. Rogers, Jr., Pittsburgh, Pa., assignor to Westinghouse Electric Corporation, East Pittsburgh, Pa., a corporation of Pennsylvania
Filed Feb. 12, 1958, Ser. No. 714,787
8 Claims. (Cl. 260—45.4)

This invention relates to electrical insulation and has particular reference to completely reactive synthetic copolymer resinous compositions suitable for use as insulation for electrical apparatus including conductors, windings, coils and the like.

In building electrical motors and generators, insulated coils to be employed therein comprise slot portions and end portions. A particularly satisfactory insulation for such coils comprises mica and a completely reactive resinous composition. In producing this type of insulated coil, sheet mica insulation is wrapped around the coil and the mica wrapped coil is impregnated with a liquid completely reactive polymerizable resinous composition. Such completely reactive resinous composition usually comprises a volatile component and a viscous resin soluble therein and copolymerizable therewith. The coil is then subjected to heat and pressure to cure the resinous impregnant to an insoluble and infusible state.

Full coils are employed in certain low voltage electrical machines. In such full coils there are two slot portions disposed at an angle to each other and connected by end or diamond portions so that the slot portions will fit into radial slots in the magnetic core of the rotor or stator of the electrical machine. The end portions are subjected to severe distortion by flexing and bending when being fitted into the radial slots. If the applied insulation comprises hard, fully cured resin, this extreme distortion will crack the hard resin and seriously damage the insulation.

To eliminate this problem, it has been proposed to wrap the coil with sheet mica insulation, impregnate the mica wrapped coil with liquid completely reactive polymerizable resinous composition and subject the slot portions only to heat and pressure to cure the resinous composition therein. The insulated end portions will comprise uncured resin and will have sufficient flexibility to withstand the severe distortion required during the coil fitting operation. After the coils have been properly placed in the electrical machine, the end portions are subjected to heat and pressure to cure the resinous composition. One problem encountered in this proposal is that the uncured resinous composition on the end portions comprises a volatile component which escapes on long exposure whereby the remainder of the composition is no longer properly curable to a thermoset resin.

In carrying out the above process it is highly desirable to have available a liquid completely reactive polymerizable resinous composition that is fully capable of forming a thermoset resin without the loss of essential components. It is also important that the resin composition have a viscosity such that it can readily and completely impregnate coils having up to sixteen layers or even more of mica tape wrapping applied thereto.

After impregnation and while the resinous composition is in the uncured stage, it is desirable that the applied insulation have the following characteristics:

(1) Capable of being subjected to extreme distortion by bending and flexing of the end portions without damage thereto.

(2) Capable of being exposed to the atmosphere for long periods of time without loss through evaporation or otherwise of essential resin components.

(3) Possess freedom from tack so that the coil can be properly fitted to the electrical machine with ease and without danger of contamination by picking up foreign matter.

After the resinous composition has been fully cured, the applied insulation should be relatively flexible and should have good thermal stability.

The object of this invention is to provide a liquid completely reactive polymerizable resinous composition comprising at least one unsaturated polyester resin, at least one unsaturated polymerizable liquid essential monomer having a moderate viscosity and relatively high boiling point and at least one liquid unsaturated polymerizable volatile monomer of quite low viscosity and also having a relatively low boiling point.

Another object of this invention is to provide electrical conductors wrapped with insulation solidly impregnated with a cured synthetic completely reactive copolymer resinous composition, said insulation having good thermal stability and good flexibility.

Figure 1:
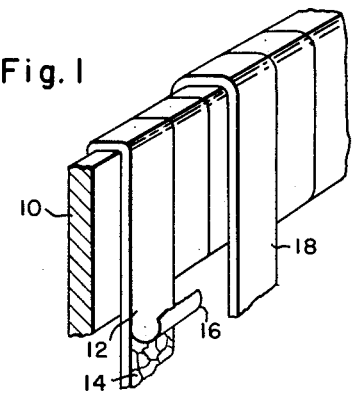

Other objects of this invention will, in part, be obvious and will, in part, appear hereinafter. For a better understanding of the nature and the objects of this invention, reference should be had to the following detailed description and drawing, in which:

FIGURE 1 is a fragmentary view in perspective illustrating one mode of building a full coil in accordance with this invention; and FIG. 2 is a plan view of a closed full coil having two slot portions.

In accordance with this invention, it has been discovered that by employing proper combinations or mixtures of two or more liquid unsaturated polymerizable monomers in combination with one or more unsaturated polyester, a liquid completely reactive polymerizable resinous compositon can be prepared which has certain desirable properties. The desirable properties will be detailed hereinafter.

The polymerizable unsaturated polyester resin component is produced by reaction of any desired combination of polycarboxylic acids and polyhydric alcohols. Particularly good results are obtained by employing as the polycarboxylic acid an ethylenically unsaturated alpha-beta dicarboxylic acid or any anhydride thereof such, for example, as maleic acid, fumaric acid, maleic anhydride, monochloromaleic acid, itaconic acid, itaconic anhydride, citraconic acid, citraconic anhydride and mesaconic acid. The unsaturated dicarboxylic acid or anhydride or mixtures thereof are reacted with a substantially molar equivalent of polyhydric alcohol, preferably a dihydric alcohol such as ethylene glycol, propylene glycol, diethylene glycol, 1,4-butanediol. However, small amounts of up to 20 mole percent of polyhydric alcohols, such as glycerol and pentaerythritol may be present. Mixtures of polyhydric alcohols may be employed. In the preparation of the unsaturated polyesters, an ethylenically saturated alpha-beta dicarboxylic acid or anhydride may be replaced with up to about 95% of the weight thereof by a saturated aliphatic dicarboxylic acid or aryl dicarboxylic acid or anhydride, such, for example, as succinic acid, adipic acid, sebacic acid, pimelic acid, suberic acid, azelaic acid, glutaric acid, phthalic acid, phthalic anhydride, isophthalic acid and terephthalic acid.

The unsaturated polyester is relatively viscous. By combining it with a lower viscosity liquid unsaturated monomer having at least one $>C=C<$ group there results a low viscosity composition capable of being cured to a thermoset solid resin upon the application of heat, particularly when catalyzed, or by radiation.

The mixture of unsaturated polymerizable liquid monomers employed in accordance with this invention will comprise from 10 to 90 parts by weight of at least one liquid reactive unsaturated monomer having a relatively high boiling point along with a moderate viscosity and having the group >C=C< capable of vinyl-type polymerization with unsaturated polyesters and forming, when alone a relatively viscous composition with the unsaturated polyester (this monomer is hereinafter referred to as the "essential monomer") and from 90 to 10 parts by weight of at least one relatively more volatile liquid of low viscosity reactive unsaturated monomer having the group >C=C< capable of vinyl-type polymerization with unsaturated polyesters (this monomer is hereinafter referred to as the "volatile monomer"). The composition of such mixture will be such that when admixed with an unsaturated polymerizable polyester, there will be provided a resinous composition having a viscosity such that it can readily impregnate a coil having up to about 16 layers of mica wrapping applied thereto. The volatile monomer component of this mixture will be present in an amount to provide a composite resinous composition having a viscosity of from about 5 centipoises to 40 centipoises at 25° C.

It is important that the combination of unsaturated polymerizable liquid monomers employed be mutually soluble and compatible with one another, and also that the mixture thereof serve as a solvent for the unsaturated polyester employed and be compatible therewith.

The essential monomers or the liquid unsaturated monomers having relatively high boiling points that are employed in this invention are those that have a boiling point above about 160° C. Esters of unsaturated monohydric alcohols and the polycarboxylic acids, including saturated and unsaturated polycarboxylic acids, halogenated aromatic polycarboxylic acids, aromatic polycarboxylic acids and polybasic inorganic acids have proven satisfactory. Examples of such esters are diallyl phthalate, diallyl isophthalate, diallyl terephthalate, diallyl succinate, diallyl maleate, diallyl fumarate, diallyl itaconate, and triallyl phosphate. Other monomers that may be employed are esters of monohydric alcohols and unsaturated polycarboxylic acids which are capable of copolymerizing with unsaturated polyester resins such, for example, as dioctyl itaconate, dibenzyl itaconate, dibutyl fumarate and dibenzyl fumarate. Triallyl cyanurate may also be employed with successful results.

The volatile monomers or the liquid unsaturated monomers having relatively low boiling points and relatively high vapor pressures and low viscosity that may be employed in carrying out this invention are those that have a boiling point not exceeding about 100° C. Examples of suitable monomers are vinyl acetate, acrylonitrile, acrylyl chloride, vinyl methyl ether, ethyl acrylate, vinyl methyl ketone, divinyl ether, vinyl formate, vinyl propionate, methyl vinyl acetate, vinyl ethyl ether, vinyl n-butyl ether, vinyl isobutyl ether and propenyl ethyl ether.

A particularly good resinous composition that may be employed in this invention is one that comprises (A) from 10% to 90% by weight of a mixture of unsaturated polyesters comprising (1) 25% to 40% by weight of the resinous reaction product derived by reacting an admixture of (a) from one mol to 8 mols of at least one saturated dicarboxylic acidic component selected from the group consisting of dicarboxylic acids and anhydrides thereof having an average of from 4 to 12 carbon atoms per molecule, (b) one mol of at least one olefinically unsaturated acidic component selected from the group consisting of dicarboxylic acids and anhydrides thereof and (c) from 2 mols to 9 mols of a dihydric alcohol selected from the group consisting of dihydric alcohols having an average of from 2 to 8 carbon atoms per molecule (usually about 10% mol excess of dihydric alcohol is employed) and (2) from 75% to 60% by weight of the resinous polyester obtained by reacting (a) about one mol of the reaction product of a dihydric phenol and a material selected from the group consisting of alkylene oxides and alkylene halohydrins, such reaction product having two reactive alcoholic hydroxy groups and (b) about one mol of at least one ethylenically unsaturated dicarboxylic acid and anhydrides thereof and (B) from 90% to 10% by weight of the mixture of liquid reactive unsaturated monomers of this invention.

In preparing the resinous polyester (2) above, at least one saturated dicarboxylic acid may be substituted for a portion of the ethylenically unsaturated dicarboxylic acid. If saturated dicarboxylic acids are employed, the mol proportion of the saturated dicarboxylic acid to the ethylenically unsaturated dicarboxylic acid will be with the range of about 1:1 to 8:1. The saturated dicarboxylic acids employed are those having from 4 to 12 carbon atoms per molecule. Examples of suitable saturated dicarboxylic acids are adipic acid, pimelic acid, suberic acid, azelaic acid and sebacic acid. Examples of suitable ethylenically unsaturated dicarboxylic acids are maleic acid, fumaric acid, itaconic acid, citraconic acid and mesaconic acid.

While the above resinous composition is of particular use as insulation for coils and the like, it will be understood that the mixture of liquid unsaturated monomers (B) may be employed alone with polyester (1) and alone with polyester (2) or with any other unsaturated polyester or combinations thereof.

The liquid resinous composition of this invention will polymerize completely upon heating in the presence of one or more vinyl addition type polymerization catalyst. Examples of such catalysts are benzoyl peroxide, lauroyl peroxide, methyl ethyl ketone peroxide, t-butyl hydroperoxide, ascaridole, t-butyl perbenzoate, ozonides and similar catalyst in an amount of from 0.1% to 2% by weight, though somewhat larger or smaller amounts may be employed if desired.

The polymerizable compositions obtainable in accordance with the present invention usually cannot be stored conveniently in mixed form since polymerization generally will take place even at room temperatures within a comparatively short period of time. To overcome or substantially minimize this difficulty it is preferred to incorporate a relatively small proportion of one or more polymerization inhibitors in the liquid completely reactive polymerizable resinous composition. Polymerization inhibitors which are suitable for use in accordance with this invention include substituted phenols and aromatic amines. More specific examples of suitable polymerization inhibitors include hydroquinone, resorcinol, tannin, sym alpha beta naphthyl p-phenylene diamine, and the like. The inhibitor preferably is employed in relatively small proportions. Thus, amounts less than about 1.0% may be used, with amounts as small as about 0.01% to about 0.1% generally being sufficient.

In preparing the (2) resinous polyester portion of the resinous composition above mentioned, there is produced initially the (a) reaction product of a dihydric phenol and an alkylene oxide or alkylene halohydrin. Such reaction products may be characterized as hydroxy-alkyl ethers. Phenols which are suitable for use in preparing the hydroxyl-alkyl ethers for use in this invention include those which have two phenolic hydroxy groups per molecule. Polynuclear phenols are particularly suitable and include those wherein the phenol nuclei are joined by carbon bridges, such for example, as 4,4'-dihydroxy-diphenyl-dimethyl-methane (referred to as bisphenol "A"), 4,4'-dihydroxy-diphenyl-methyl-methane and 4,4'-dihydroxy-diphenyl-methane. Suitable alkylene oxides include ethylene oxide, propylene oxide and butylene oxide. If desired, the hydroxy-alkyl ethers also may be prepared by reacting an alkylene halohydrin such as ethylene chlorohydrin, ethylene bromohydrin, propylene chlorohydrin, propylene bromohydrin, butylene bromohydrin and butylene chlorohydrin with an alkali metal salt of the 4,4'-dihydroxy-diphenyl-dimethyl-methane.

The hydroxy-alkyl ether starting material may be prepared by the direct reaction of an alkylene oxide such as ethylene oxide with bisphenol "A." The reaction may be carried out by agitating the bisphenol "A" at a temperature between 125° C. and 170° C. while adding alkylene oxide in small amounts until the desired amount has been added. A catalyst such as sodium hydroxide may be employed, if desired. The hydroxy-alkyl ether thus obtained may be separated from the reaction mixture by distilling off low boiling ingredients.

The hydroxy-alkyl ethers then are esterified with the desired amount of ethylenically unsaturated dicarboxylic acid or anhydride thereof. The esterified product thus obtained may be further reacted, if desired, with one or more saturated dicarboxylic acids having at least 4 carbon atoms per molecule.

For a fuller discussion of hydroxy-alkyl ethers, their method of preparation and their reaction with unsaturated and saturated dicarboxylic acids, reference is made to application Serial No. 421,590, now Patent 2,829,191, dated April 1, 1958, assigned to the assignee of the present invention.

The following examples illustrate the preparation of resinous impregnating compositions for use in this invention.

*Example I*

(A) The following ingredients are employed:

| | Pounds |
|---|---|
| Ethylene glycol | 544 |
| 1,4-butanediol | 992 |
| Adipic acid | 1168 |
| Fumaric acid | 464 |
| Isophthalic acid | 996 |

The ethylene glycol and the 1,4-butanediol are placed in a reaction vessel. A 10 cu. ft. per minute flow of nitrogen gas is bubbled through the material to enable sparging thereof, and heat and agitation are applied. When the temperature of the material being agitated reaches approximately 160° C., the isophthalic acid is added. Heating, sparging and agitation are continued until the material in the reaction vessel is clear. The temperature of the reaction product during this period should not exceed about 180° C. The product is cooled to about 145° C. and the fumaric acid and adipic acid are added. The resultant mixture is heated to about 160° C. and held there for approximately 3½ hours. The temperature is then increased to about 205° C. and held there until one part of a sample of the material taken from the vessel and dissolved in ½ part by weight of monostyrene as a S–U viscosity on the Gardner-Holdt scale. The product in the vessel is cooled, and when the temperature reaches about 160° C. 0.008% of hydroquinone as a 5% solution in dibutyl phthalate is added and cooling to room temperature is then obtained. The water of reaction formed during esterification is carried off by the sparging gas.

(B) A mixture of 2270 pounds of 2,2-bis [para hydroxy propoxy phenyl] propane (referred to as "Bis-glycol") and 588 pounds of maleic anhydride are placed in a reaction vessel. The mixture is heated to a temperature of about 200° C. and held there until a sample of the material taken from the reaction vessel and dissolved in styrene in a weight ratio of 2:1 has a viscosity of Y–Z on the Gardner-Holdt scale. The material is cooled to room temperature. During cooling, at a temperature of about 160° C., 0.008% hydroquinone as a 5% solution in dibutyl phthalate is added to the material in the reaction vessel. Bis-glycol referred to above is the reaction product of bisphenol "A" and propylene oxide.

(C) An impregnating completely reacting polymerizable resinous composition is prepared by mixing together 2295 pounds of the product produced in part (B), 765 pounds of the product produced in part (A), 540 pounds of diallyl phthalate and 1930 pounds of vinyl acetate to produce a completely reactive polymerizable liquid resinous composition. The viscosity of the resulting is about 20 centipoises at 25° C. Just prior to employing this resinous composition 0.5% by weight of t-butyl perbenzoate is added to enable the resinous composition to cure readily.

An example of a suitable mixture comprising more than two monomers that may be employed in this invention is one comprising one part by weight of diallyl phthalate, one part by weight of diallyl isophthalate, two parts by weight of acrylyl chloride and four parts by weight of vinyl acetate.

*Example II*

(A) In accordance with the procedure of Example I (A) the following ingredients are reacted:

| | Mols |
|---|---|
| Ethylene glycol | 2.2 |
| 1,5-pentanediol | 2.2 |
| Adipic acid | 1.0 |
| Fumaric acid | 1.0 |
| Isophthalic acid | 1.5 |

(B) About 5.5 mols of 2,2-bis [para hydroxy propoxy phenyl] propane are placed in a reaction vessel. A 10 cu. ft. per minute flow of nitrogen gas is bubbled through the material to enable sparging thereof and heat and agitation are applied. When the temperature of the material being agitated has reached about 125° C. about 4 mols of adipic acid are then introduced into the reaction vessel. The resultant mixture then is heated to a temperature of from about 150° C. to 160° C. and held there for about 3 hours, the water of reaction formed during the esterification being carried off by the sparging gas. The esterified product thus obtained is cooled to 125° C., whereupon one mol of maleic anhydride is introduced into the reaction vessel. The resultant mixture is heated to a temperature of about 200° C. for a period of about 9 hours with agitation. The product obtained is a viscous resinous polyester.

(C) An impregnating completely reactive polymerizable resinous composition is prepared by mixing together 2290 pounds of the material produced in part (B), 770 pounds of the material produced in part (A), 550 pounds of diallyl isophthalate and 1910 pounds of acrylonitrile.

Referring to FIG. 1 of the drawing, there is illustrated coil 10, shown as a single strap of copper for instance, but which may comprise a plurality of turns of separate conductors, which is first wrapped with an overlapping layer of tape 12. The tape 12 comprises mica flakes 14 and a sheet backing 16 all united with a liquid resinous binder. The tape may be applied half-lapped, butted or otherwise. One or more additional layers 18 of mica tape similar to tape 12 may be applied, a total of 16 or more layers of mica tape being used for the highest voltage coils. To impart better abrasion resistance and to secure a tighter insulation an outer wrapping of a tape of a tough fibrous material, such as, glass fiber, asbestos or the like is applied to the coil.

The mica tape for building coils in accordance with the present invention is prepared from a sheet backing material upon which is disposed a layer of mica flakes and the sheet backing and the mica flakes are treated with a liquid resinous binder having a viscosity of between 25 and 10,000 poises at 25° C. The mica flakes are then preferably covered with another layer of sheet backing in order to protect the layer of mica flakes and to produce a more uniform insulation. This mica insulation is preferably in the form of a tape of the order of one inch in width through tapes or sheet insulation of any other width may be prepared. U.S. Patent No. 2,763,315 assigned to the assignee of the present invention, describes in detail the preparation of such composite mica insulation, and reference may be had to that application for details as to the compositions and the methods or preparation of such tapes.

For building electrical machines, the sheet backing for the tape may comprise paper, cotton fabrics, asbestos paper, glass cloth or glass mat, or sheets or fabrics prepared from synthetic resins such as nylon, polyethylene and linear polyethylene terephthalate resins. Sheet backing material of a thickness of approximately 1 mil to which there has been applied a layer of from 3 to 10 mils thickness of mica flakes has been successfully employed. The liquid binders for the mica flakes are preferably linear polyesters that are liquids. Such polyesters are soluble in and compatible with the unsaturated polyester resinous compositions of this invention that will be employed in subsequently impregnating the coils insulated with such tapes.

Liquid binders comprising silicone modified polyesters have been used in making satisfactory mica tape for the purpose of this invention. Reference should be had to Patent No. 2,763,315 for further details with respect to suitable resinous binders for the mica tapes. In any event, the liquid resinous binder for the mica tape should be from 3% to 25% by weight of the complete tape and preferably from 3% to 8% by weight for optimum strength. It has been found that tapes so prepared are extremely flexible and possess considerable strength so that they may be wrapped firmly and tightly about conductors. While the resinous binder is a liquid, when used in the amounts indicated, the tapes do not appear wet, nor is there any appreciable exudation or bleeding of the liquid binder from the tapes.

The coil with the applied layers of mica insulation is then vacuum impregnated with the liquid completely reactive polymerizable resinous composition of this invention. After vacuum impregnation the insulated coil is exposed to the atmosphere and even though substantially all of the volatile monomer evaporates, the essential monomer remains to co-react satisfactorily with the unsaturated polyester to form, upon the application of heat and pressure, a thermally stable, relatively flexible insulation. Any volatile monomer that has not been removed by evaporation and which is still present in the resinous composition will also coreact satisfactorily with the unsaturated polyester during the application of heat and pressure.

It will be understood that on any coils in which the composition is not cured immediately after impregnation the volatile monomer will usually completely evaporate on standing for a period of hours.

After substantially all the volatile monomers have been removed by evaporation and while the resinous composition is in the uncured stage, the insulation on the coil is tack free and the end portions can be flexed and bent without damage to the applied insulation. It is believed that a small amount of the volatile monomer may be present even after a considerable time of exposure to the atmosphere.

The resinous compositions of this invention are particularly well suited for use in practicing the insulated coil making process of U.S. Patent No. 2,757,298, assigned to the assignee of the present invention. The composition of Example I of this invention has been employed with considerable success for making both full and half coils by the process of Patent 2,757,298.

Thus, in insulating full coils, the shaped coil conductors are completely wrapped with the composite mica tape wrapper, except for the leads thereof. Thereafter, the fully taped coils are vacuum impregnated with the completely reactive resinous compositions of Example I. The vacuum impregnation enables moisture, air and volatile material present in the insulation to be withdrawn and then the coil is immersed in a liquid completely reactive resinous composition. During impregnation, positive pressure may be applied to the resinous composition to force it into all the interstices and spaces in the mica insulation present on the coils. The coil is then withdrawn from the impregnating tank and permitted to drain slightly. The coil is then exposed to the atmosphere and substantially all of the volatile monomer evaporates. The resulting coil is tack free and can be easily handled without danger of contamination. There is no loss of vital or essential resin components, therefore, there is no need to wrap the coil with a layer of impervious material such as is done in Patent 2,757,298.

If desired, the slot portions can be wrapped with a layer of glass fiber tape or other tape to impart greater strength and abrasion resistance.

Coils produced by the impregnation of the mica wrapping with any of the completely reactive compositions of this invention are placed in a hot press in which the slot portions only are subjected to heat and pressure for a period of time of from about one hour at 100° C. to 150° C. which conditions are adequate to cure the resinous composition in the slot portions. The end portions of the windings will be substantially uncured. This hot pressing operation produces a coil having a slot portion of the exact size required for the electrical machine and can be fitted into the slots of the electrical machine readily with flexing of the end portions.

A closed full coil 20 prepared in accordance with the present invention is illustrated in FIG. 2. The full coil comprises an end portion comprising a tangent 22, a connecting loop 24 and another tangent 26 with bare leads 28 extending therefrom. Slot portions 30 and 32 of the coil which have been hot pressed to cure the resin and to form them to predetermined shape and size, are connected to the tangents 22 and 26, respectively. These slot portions are connected to other tangents 34 and 36 connected through another loop 38. It will be noted that the insulation at portions 22, 24, 26, 34, 36 and 38 is heavier and not as compact as is the insulation at the slot portions 30 and 32.

The complete full coils prepared as disclosed herein, with cured slot portions and uncured end portions are placed within the slots of the stator or rotor of an electrical machine and the end windings wrapped and tied together. The uninsulated leads are then soldered, welded or otherwise connected to each other or to the commutator. Thereafter, the entire machine will be placed in an oven and heated to a temperature to cure the completely reactive composition applied to the end portions.

In the coil shown in FIG. 2, the end portions comprise mica tape containing the liquid polymerizable resin impregnant at the time that the coils are being disposed within the slots of the electrical machine, while the slot portions are substantially completely cured and shaped. However, after the coils have been placed in an electrical machine, and laced or tied and otherwise not subjected to any further twisting or bending, the compositions in the end portions are cured by subjecting them to suitable baking or heating. The heating may be accomplished by placing the entire electrical machine in an oven or by passing an electrical current through the windings sufficient to cause them to heat up at a temperature adequate to polymerize the impregnated compositions. Infrared heating lamps may be employed alone or in combination with such other heating means.

Coils carry insulation comprising the uncured resinous composition of this invention can be exposed to the atmosphere for considerable periods of time before being inserted in electrical machines without danger of loss of any of the essential or vital completely reactive resinous composition. The surface of the applied insulation is free from tack and can be easily handled and moved about without danger of contamination.

It will be understood that the above description and drawing are exemplary and not in limitation of the invention.

I claim as my invention:

1. A polymerizable resinous compound composition comprising (A) from 10% to 90% by weight of a mixture of (1) from 25% to 40% by weight of the resinous reaction product derived by reacting an admixture (a) from 1 mol to 8 mols of at least one saturated dicarboxylic acid component selected from the group consisting of dicarboxylic acids and anhydrides thereof having an average of from 4 to 12 carbon atoms per molecule, (b) one mol of at least one ethylenically unsaturated acidic component selected from the group consisting of dicarboxylic acids and anhydrides thereof, and (c) from 2 mols to 9 mols of a polyhydric alcohol selected from the group consisting of dihydric alcohols having an average of from 2 to 8 carbon atoms per molecule, the number of mols of (c) being substantially equal to the total number of mols of (a) and (b) and (2) from 75% to 60% by weight of the resinous reaction product derived by reacting (a) about one mol of the reaction product of a dihydric phenol and a material selected from the group consisting of alkylene oxides and alkylene halohydrins, such reaction product having only two reactive alcoholic hydroxyl groups, and (b) about one mol of at least one olefinically unsaturated acidic component selected from the group consisting of dicarboxylic acids and anhydrides thereof, and (B) from 90% to 10% by weight of a mixture of (1) from 10 parts to 90 parts by weight of at least one liquid reactive unsaturated monomer having the group $>C=C<$ capable of vinyl-type polymerization with unsaturated polyesters, said monomer having a boiling point in excess of about 160° C. and forming, when alone, a relatively viscous composition with mixture (A), and (2) from 90 parts to 10 parts by weight of at least one relatively more volatile and low viscosity liquid reactive unsaturated monomer having the group $>C=C<$ capable of vinyl-type polymerization with unsaturated polyesters, said monomer having a boiling point of less than about 100° C., the said monomer (2) being present in an amount to provide a composite resin composition having a viscosity of from 5 cps. to 40 cps. at 25° C.

2. A polymerizable resinous composition comprising (A) from 10% to 90% by weight of a mixture of (1) from 25% to 40% by weight of resinous reaction product derived by reacting an admixture (a) from 1 mol to 8 mols of at least one saturated dicarboxylic acid component selected from the group consisting of dicarboxylic acids and anhydrides thereof having an average of from 4 to 12 carbon atoms per molecule, (b) one mol of at least one ethylenically unsaturated acidic component selected from the group consisting of dicarboxylic acids and anhydrides thereof, and (c) from 2 mols to 9 mols of a polyhydric alcohol selected from the group consisting of dihydric alcohols having an average of from 2 to 8 carbon atoms per molecule, the number of mols of (c) being substantially equal to the total number of mols of (a) and (b) and (2) from 75% to 60% by weight of the resinous reaction product derived by reacting (a) the reaction product of a dihydric phenol and a material selected from the group consisting of alkylene oxides and alkylene halohydrins, such reaction product having only two reactive alcoholic hydroxyl groups, (b) at least one olefinically unsaturated acidic component selected from the group consisting of dicarboxylic acids and anhydrides thereof, and (c) at least one saturated dicarboxylic acid component selected from the group consisting of dicarboxylic acids and anhydrides thereof having an average of from 4 to 12 carbon atoms per molecule, the mol proportion of the (c) saturated dicarboxylic acids to the (b) olefinically unsaturated dicarboxylic acids being within the range of 1:1 to 8:1 and the mol proportion of the dicarboxylic acid (b) and (c) to the reaction product (a) being about 1:1, and (B) from 90% to 10% by weight of a mixture of (1) from 10 parts to 90 parts by weight of at least one liquid reactive unsaturated monomer having the group $>C=C<$ capable of vinyl-type polymerization with unsaturated polyesters, said monomer having a boiling point in excess of about 160° C. and forming, when alone, a relatively viscous composition with mixture (A), and (2) from 90 parts to 10 parts by weight of at least one relatively more volatile and low viscosity liquid reactive unsaturated monomer having the group $>C=C<$ capable of vinyl-type polymerization with unsaturated polyesters, said monomer having a boiling point of less than about 100° C., the said monomer (2) being present in an amount to provide a composite resin composition having a viscosity of from 5 cps. to 40 cps. at 25° C.

3. In the method of making a resin impregnated electrical member, which member comprises an electrical winding, the steps comprising (I) applying to the electrical winding a polymerizable resinous composition comprising (A) from 10% to 90% by weight of at least one unsaturated polyester and (B) from 90% to 10% by weight of a mixture of (1) at least one liquid reactive unsaturated monomer having the group $>C=C<$ capable of vinyl-type polymerization with unsaturated polyesters, said monomer having a boiling point in excess of about 160° C. and forming, when alone, a relatively viscous composition with polyester (A), and (2) at least one relatively more volatile liquid reactive unsaturated monomer having the group $>C=C<$ capable of vinyl-type polymerization with unsaturated polyesters, said monomer having a boiling point of less than about 100° C., said monomer being present in an amount to provide a composite resin composition having a viscosity of from 5 cps. to 40 cps. at 25° C., (II) exposing the impregnated wrapped winding to the atmosphere whereby the relatively more volatile liquid reactive monomer (2) evaporates and (III) subjecting the winding and resin impregnant to heat to polymerize the resin composition to a fully cured thermoset state.

4. A resin impregnated electrical member, which member comprises an electrical winding, prepared in accordance with the method of claim 3.

5. In the method of making a resin impregnated electrical member, which member comprises an electrical winding, the steps comprising (I) applying to the electrical winding a polymerizable resinous composition comprising (A) from 10% to 90% by weight of a mixture of (1) from 25% to 40% by weight of resinous reaction product derived by reacting an admixture (a) from 1 mol to 8 mols of at least one saturated dicarboxylic acid component selected from the group consisting of dicarboxylic acids and anhydrides thereof having an average of from 4 to 12 carbon atoms per molecule, (b) one mol of at least one olefinically unsaturated acidic component selected from the group consisting of dicarboxylic acids and anhydrides thereof, and (c) from 2 mols to 9 mols of a polyhydric alcohol selected from the group consisting of dihydric alcohols having an average of from 2 to 8 carbon atoms per molecule, the number of mols of (c) being substantially equal to the total number of mols of (a) and (b) and (2) from 75% to 60% by weight of the resinous reaction product derived by reacting (a) about one mol of the reaction product of a dihydric phenol and a material selected from the group consisting of alkylene oxides and alkylene halohydrins, such reaction product having only two reactive alcoholic hydroxyl groups, and (b) about one mol of at least one olefinically unsaturated acidic component selected from the group consisting of dicarboxylic acids and anhydrides thereof, and (B) from 90% to 10% by weight of a mixture of (1) from 10 parts to 90 parts by weight of at least one liquid reactive unsaturated monomer having the group $>C=C<$ capable of vinyl-type polymerization with unsaturated polyesters, said monomer having a boiling point in excess of about 160° C. and forming, when alone, a relatively viscous composition with polyester (A), and (2) from 90 parts to 10 parts by weight of at least one relatively more volatile and low viscosity liquid reactive unsaturated monomer having the group $>C=C<$ capable of vinyl-type polymerization with unsaturated polyesters, said monomer having a boiling point of less than about 100° C., the said monomer (2) being present in an amount to provide a composite resin composition having a viscosity of from 5 cps. to 40 cps. at 25° C., (II) exposing the impregnated wrapped winding to the atmosphere whereby the relatively more volatile liquid reactive monomer (2) evaporates, and (III) subjecting the widing and resin impregnant to heat to polymerize the resin composition to a fully cured thermoset state.

6. A resin impregnated electrical member, which member comprises an electrical winding, prepared in accordance with the method of claim 5.

7. In the method of making a resin impregnated electrical member, which member comprises an electrical winding, the steps comprising (I) applying to the electrical winding a polymerizable resinous composition comprising (A) from 10% to 90% by weight of a mixture of (1) from 25% to 40% by weight of a resinous reaction product derived by reacting an admixture of (a) from 1 mol to 8 mols of at least one saturated dicarboxylic acidic component selected from the group consisting of dicarboxylic acids and anhydrides thereof having an average of from 4 to 12 carbon atoms per molecule, (b) one mol of at least one olefinically unsaturated acidic component selected from the group consisting of dicarboxylic acids and anhydrides thereof, and (c) from 2 mols to 9 mols of a polyhydric alcohol selected from the group consisting of dihydric alcohols having an average of from 2 to 8 carbon atoms per molecule, the number of mols of (c) being substantially equal to the total number of mols of (a) and (b) and (2) from 75% to 60% by weight of the resinous reaction product derived by reacting (i) the reaction product of a dihydric phenol and a material selected from the group consisting of alkylene oxides and alkylene halohydrins, such reaction product having only two reactive alcoholic hydroxyl groups, (ii) at least one olefinically unsaturated acidic component selected from the group consisting of dicarboxylic acids and anhydrides thereof, and (iii) at least one saturated dicarboxylic acidic component selected from the group consisting of dicarboxylic acids and anhydrides thereof having an average of from 4 to 12 carbon atoms per molecule, the mol proportion of (iii) to (ii) being within the range of 1:1 to 8:1 and the mol proportion of the sum of (ii) and (iii) to (i) being about 1:1, and (B) from 90% to 10% by weight of a mixture of (1) from 10 parts to 90 parts by weight of at least one liquid reactive unsaturated monomer having the group $>C=C<$ capable of vinyl-type polymerization with unsaturated polyesters, said monomer having a boiling point in excess of about 160° C. and forming, when alone, a relatively viscous composition with mixture (A), and (2) from 90 parts to 10 parts by weight of at least one relatively more volatile and low viscosity liquid reactive unsaturated monomer having the group $>C=C<$ capable of vinyl-type polymerization with unsaturated polyesters, said monomer (2) having a boiling point of less than about 100° C. and being present in an amount to provide a composite resin composition having a viscosity of from 5 cps. to 40 cps. at 25° C., (II) exposing the impregnated wrapped winding to the atmosphere whereby the relatively more volatile liquid reactive monomer (2) evaporates, and (III) subjecting the winding and resin impregnant to heat to polymerize the resin composition to a fully cured thermoset state.

8. A resin impregnated electrical member, which member comprises an electrical winding, prepared in accordance with the method of claim 7.

References Cited in the file of this patent

UNITED STATES PATENTS

| | | |
|---|---|---|
| 2,677,067 | Johnson et al. | Apr. 27, 1954 |
| 2,818,399 | Drechsel | Dec. 31, 1957 |
| 2,844,559 | Parker | July 22, 1958 |
| 2,882,256 | Waychoff | June 17, 1959 |
| 2,898,259 | Wheelock | Aug. 4, 1959 |

FOREIGN PATENTS

| | | |
|---|---|---|
| 722,273 | Great Britain | Jan. 19, 1955 |
| 732,823 | Great Britain | June 29, 1955 |
| 780,521 | Great Britain | Aug. 7, 1957 |
| 529,850 | Canada | Sept. 4, 1956 |